(12) United States Patent
Chuang

(10) Patent No.: US 6,784,276 B1
(45) Date of Patent: Aug. 31, 2004

(54) HIGH-SOLIDS POLYIMIDE PRECURSOR SOLUTIONS

(75) Inventor: Chun-Hua Chuang, Brecksville, OH (US)

(73) Assignee: The United States of America as represented by the United States National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/202,643

(22) Filed: Jul. 25, 2002

(51) Int. Cl.$^7$ .................. C08G 73/10; C08G 69/28; B67C 67/14
(52) U.S. Cl. .................. 528/170; 528/125; 528/126; 528/128; 528/172; 528/173; 528/79; 528/183; 528/188; 528/220; 528/229; 528/350; 528/351; 528/353; 525/419; 525/420; 525/422; 525/432; 524/600; 524/602; 524/606; 427/256; 427/384; 264/257; 264/258; 264/331.12; 264/331.21
(58) Field of Search .................. 528/125–126, 528/128, 170, 172–173, 179, 183, 188, 220, 229, 350, 351, 353; 525/419–420, 422, 432; 524/600, 602, 606; 264/257–258, 331.12, 331.21; 427/256, 384

(56) References Cited

U.S. PATENT DOCUMENTS

| | | | | |
|---|---|---|---|---|
| 3,745,149 A | | 7/1973 | Serafini et al. ............ 260/65 |
| 4,338,430 A | * | 7/1982 | Edelman ................ 528/222 |
| 4,395,514 A | * | 7/1983 | Edelman ................ 524/600 |
| 5,091,505 A | | 2/1992 | Serafini et al. ............ 528/353 |
| 5,149,772 A | | 9/1992 | Serafini et al. ............ 528/353 |
| 5,162,492 A | | 11/1992 | Kaku ................ 528/353 |
| 5,290,497 A | * | 3/1994 | Kurita et al. ............ 264/176.1 |
| 5,312,579 A | * | 5/1994 | Druyun et al. ............ 264/258 |
| 5,338,827 A | | 8/1994 | Serafini et al. ............ 528/353 |
| 5,360,671 A | * | 11/1994 | Harris ................ 428/473.5 |
| 5,939,521 A | * | 8/1999 | Chuang ................ 528/353 |
| 6,069,278 A | * | 5/2000 | Chuang ................ 564/418 |
| 6,103,864 A | | 8/2000 | Alston et al. ............ 528/353 |
| 6,222,007 B1 | * | 4/2001 | Cano et al. ............ 528/353 |

* cited by examiner

*Primary Examiner*—P. Hampton Hightower
(74) *Attorney, Agent, or Firm*—Kent N. Stone; James V. Tura

(57) ABSTRACT

This invention is a highly concentrated stable solution of polyimide precursors (monomers) having a solids content ranging from about 80 to 98 percent by weight in lower aliphatic alcohols i.e. methyl and/or ethyl alcohol. The concentrated polyimide precursor solution comprises effective amounts of at least one aromatic diamine, at least one aromatic dianhydride or a lower molecular weight alkyl ester of said dianhydride, and a monofunctional endcap including monoamines, monoanhydrides and the lower alkyl esters of said monoanhydrides. These concentrated polyimide precursor solutions are particularly useful for the preparation of fibrous prepregs and composites for use in structural materials for military and civil applications.

20 Claims, No Drawings

HIGH-SOLIDS POLYIMIDE PRECURSOR SOLUTIONS

ORIGIN OF INVENTION

The invention described herein was made by an employee of the United States Government and may be manufactured and used by or for the Government for governmental purposes without the payment of any royalties thereon or therefor.

BACKGROUND OF INVENTION

1. Field of the Invention

This invention relates to stable solutions of polyimide precursors (monomers) having a solids content ranging from about 80 to 98 percent by weight, preferably 85–98% of the precursors in lower molecular weight alcohols. The concentrated solutions of polyimide precursors comprise effective amounts of aromatic dianhydrides, aromatic diamines and reactive crosslinkable monofunctional endcaps. More specifically, the concentrated solutions of polyimide precursors comprises a mixture of lower alkyl di- and/or monoesters of an aromatic dianhydride, aromatic diamines, and monofunctional endcaps. The endcaps include monofunctional amines, monofunctional anhydrides, and alkyl monester-acids or alkyl diesters of monofunctional anhydrides wherein the lower alkyl groups have 1 or 2 carbons, e.g. the alkyl esters are derived from low molecular weight aliphatic alcohols such as methyl and ethyl alcohol. The high-solid monomer or precursor solutions solidify at room temperature, and essentially immobilize all the monomer reactants preventing the aging process of the monomer solution induced by chemical reactions. The solid monomer solution can be stored and shipped at room temperature with unlimited shelf-life, eliminating the need of shipping these monomer solutions with dry ice. Prepregs are prepared by impregnating fibrous materials e.g. carbon and glass fibers with effective amounts of the highly concentrated stable solutions of the polyimide precursors.

2. Description of Related Prior Art

Polymerization of Monomer Reactants (PMR) to obtain polyimides is a class of high performance composite resins. Polyimide graphite fiber-reinforced composites are increasingly used in various aircraft engine components, which operate at temperatures ranging up to 371° C. for thousands of hours. For example, PMR-15 is one of the best known and most widely used PMR polyimide. PMR-15 attributes include relatively easy processing, substantially lower costs, and excellent property retention at elevated temperatures, compared to other commercially available high temperature resin materials.

The preparation of polyimides from mixtures of monomeric diamines and esters of polycarboxylic acids is disclosed, for example, in U.S. Pat. No. 3,745,149. Patentee disclosed that polyimides can be processed from a mixture of monomeric reactants using lower alcohols to esterify an anhydride endcap and an aromatic dianhydride. These monomeric reactants when combined with an aromatic diamine in the molar ration, of N diester-diacid/N+1 diamine/2 ester-acid endcap, form a monomeric mixture which at high temperature polymerizes to a polyimide. This procedure was the evolution of the terminology PMR (polymerization of monomeric reactants).

More specifically, U.S. Pat. No. 3,745,149 discloses the use of a 50–70% solid content of monomer reactants in methanol which has to be stored in the freezer and overnight shipped in dry ice to prevent the aging process generated by the chemical reactions among the monomers that occur at room temperature. During the prepreg production by the hot-melt process, a 50% monomer solution is concentrated by boiling off the excess methanol under vacuum. The heating of monomer solutions in methanol promotes the reactions among the monomer reactants and essentially accelerated the aging process. This extra step also requires additional labor cost. As a result, prepregs produced by the hot-melt process from a 50–70% solid content in liquid form exhibited less resin mobility during the processing of prepreg laminates into composites. A more recent modification discloses the use of isopropyl alcohol to make the corresponding ester-acids to extend the shelf-life of monomer reactants. However, isopropanol (boiling point of 82.4° C., heat of vaporization=39.85 Kjoul/mol) as a solvent is more difficult to remove than either ethanol (BP=78° C., heat of vaporization=38.6 Kjoul/mol) or methanol (BP=64.7° C., heat of vaporization=35.21 Kjoul/mol) during laminate processing. Upon imidization, the use of isopropyl ester-acids as the monomer reactants will loose more weight due to the evaporation of isopropanol as compared to other alcohols (MW of isopropanol=60 g/mol, ethanol=46 g/mole, methanol=32 g/mol), thus yielding lower resin content in the composites compared to either the ethyl ester or methyl ester.

A major disadvantage of the state-of-the-art PMR technology, as practiced commercially today, is the limited shelf life of the monomeric solutions at room temperatures, the short working outlife time, and an extremely high sensitivity toward premature aging at temperatures even slightly above room temperature. The disadvantages cause premature polymerization during all phases of PMR usage such as in synthesis, manufacturing, shipping, handling, storage, and fabrication layup/processing. Moreover, the 50–70% monomer solutions are difficult to adapt to low-cost manufacturing processes such as resin transfer molding (RTM) due to the large quantity of solvent that needs to be removed.

The present answer to premature aging of PMR solutions and the preparation of prepregs has been through rigorous handling requirements via strict manufacturing temperature control, over-night air shipment in dry ice, freezer storage of PMR materials, stringent quality control governing allowed outlife usage time, and freezer storage time which significantly adds to the final cost of PMR composites. In comparison, the high-solids polyimide precursor monomer solution of this invention is based on a process that significantly retards aging of the PMR solutions and PMR prepregs, rather than being based on the rigid temperature controls as evolved and practiced in present PMR technology. Moreover, the instant process extends to other manufacturing processes such as solvent assisted RTM and resin infusion.

SUMMARY OF THE INVENTION

This invention relates to stable solutions of polyimide precursors (monomers) having a solids content ranging from about 80 to 98 percent and preferably from 85 to 98% by weight of said polyimide precursors in lower molecular weight alcohols i.e. aliphatic alcohols having 1 or 2 carbon atoms. The concentrated solutions of the polyimide precursors comprise effective amounts of at least one aromatic diamine, at least one dianhydride selected from the group consisting of aromatic dianhydrides and lower alkyl ester-acids i.e. mono and dialkyl esters of aromatic dianhydrides wherein the alkyl ester groups have 1 or 2 carbon atoms, and at least one mono functional endcap selected from the group consisting of aromatic monoamines, aromatic monoanhydrides and alkyl esters of monoanhydrides wherein the alkyl ester groups have 1 or 2 carbons. Prepregs are prepared with these highly concentrated solutions by directly impregnating a fibrous material such as carbon or glass fibers to obtain high temperature polyimide composites for use in structural materials in military and civil applications such as jet engine cowls and ducts because of the light-weight, load-bearing characteristics and stability at high temperatures.

Accordingly, it is an object of this invention to improve the stability and shelf-life of polyimide precursor (monomer) solutions by providing highly concentrated solutions which arc not sensitive to premature aging at room temperature.

It is another object of this invention to provide highly concentrated polyimide precursor solutions for use in preparing polyimide prepregs.

It is still another object of this invention to provide a stable mixture of polyimide precursors at high concentrations in low molecular weight alcohols for use in the preparation of PMR prepregs.

It is a further object of this invention to provide highly concentrated solutions of polyimide precursors to enable PMR polyimides to adapt to the resin infusion process and solvent assisted resin transfer molding (Sa RTM).

These and other objects of this invention will become apparent from a further and more detailed description of the invention.

DESCRIPTION OF THE PREFERRED EMBODIMENTS

This invention relates to highly concentrated solutions of polyimide precursors (monomers), and the use of said concentrated solutions for the preparation of polyimide prepregs. More specifically, this invention relates to the process of preparing highly concentrated precursor (monomer) solutions with 80–98% by weight solids in lower aliphatic alcohols. The polyimide precursor solutions comprise mixtures of alkyl ester-acids of aromatic dianhydrides, an aromatic diamine and a monofunctional endcap terminated either with a monoamine or a di- or monoester-acid along with other reactive and crosslinkable units wherein the alkyl radicals of the ester-acids are derived from low molecular weight of aliphatic alcohols. The high solid content monomer solutions solidify at room temperature and essentially immobilize all the monomer reactants; thereby preventing the aging process of the solutions induced by chemical reactions among the reactants. The high solid monomer solutions can be stored and shipped at room temperature with unlimited shelf-life; thus eliminating the need of shipping monomer solutions with dry ice. Upon warming to near the boiling points of the corresponding alcohols, the solid monomer solutions melt into liquid form which can be adapted to solvent assisted resin transfer molding (SaRTM) and resin infusion as well as the prepreg process to fabricate aerospace components and adhesive formulations.

To enable the PMR polyimides to adapt to the resin infusion process and the solvent assisted resin transfer molding (SaRTM), a highly concentrated monomer solution (80–98% solid content) in alcohols such as ethanol or methanol, yield solid monomer reactants at room temperature. The solid monomer solution immobilizes all the monomer reactants and prevents the aging process which is generally induced by the chemical reactions among the monomers in the liquid form of monomer solutions. A preferred process involves the direct preparation of a mixture of a highly concentrated solution (80–98%) comprising at least one aromatic diamine, at least one dimethyl or diethyl ester of an aromatic dianhydride, and a mono functional endcap such as a nadic anhydride ester, 4-phenylethynylphthalic ester-acid, 3- or 4-pheylethylaniline, 3- or 4-aminophenylacetylene, 3- or 4-aminostyrene and other known reactive endcaps. This mixture is heated to 70–130° C. in a lower alkyl alcohol with efficient stirring until it becomes a homogeneous solution. Upon cooling to room temperature, the highly concentrated polyimide monomer or precursor solution solidifies. The solid monomer solution can be heated subsequently to the boiling point of the corresponding alcohol or higher until it melts into a liquid solution of desired viscosity in a short period for resin infusion, solvent assisted RTM, prepregs by hot-melt or film methods and adhesive formulations. This process improves the processability and quality of the prepregs compared to the prior arts conventional 50–70% monomer solutions which have to be concentrated by heating the monomer solutions under vacuum to remove the excess alcohols. The present conventional heating process promotes premature aging of the resin through the reaction among the monomers, and often yields inferior, less tacky prepregs. Ethanol is preferred over methanol in the instant process because the methyl esters of anhydrides react faster than the corresponding ethyl esters, which leads to a faster aging process. Additionally, methanol evaporates faster than ethanol and is harder to yield a repeated uniform control in the process of this invention.

The unique feature of the instant process is the use of a stable high solid content (80–98%) monomer solutions for the preparation of PMR polyimides. This process produces a polyimide precursor solution in solid form which can be stored at room temperature indefinitely, and easily shipped without dry ice while also eliminating the hazard of transporting flammable liquid alcohol. The solidified monomer solution can be prepared to the desirable concentration suitable for resin infusion and solvent assisted RTM, the prepregging process or adhesive formulations. The solid mixture of precursors can be warmed up quickly in a short period of time without aging the resin solution. Due to the unlimited shelf-life of the solidified monomer solutions, these solid solutions can be made in large quantities in pilot scale to lower the cost of production and qualification tests as compared to the current prior art production of small scale solutions.

A preferred embodiment of this invention comprises the composition and process of mixing and refluxing an aromatic dianhydride and a reactive monofunctional anhydride such as the nadic anhydride or 4-phenylethynylphthalic anhydride as a crosslinkable endcap in minimum amount of ethanol in any ratio to from the corresponding esters and adding the aromatic diamine slowly to the warmed (70–140° C.) concentrated monomer solution to reach the 8098% solid content. Alternatively, the dianhydride can be converted to its ester and then mixed with either an aromatic diamine and a monofunctional amine endcap such as 3- or 4-phenylthynylaniline at very high concentration (about 80–98% solid content) in various ratio. In addition, concentrated precursor solutions of polyimide copolymers can be prepared with more than one aromatic dianhydride and more than one aromatic diamine by the same process. Upon cooling the highly concentrated monomer reactant solution solidifies and therefore can be stored and shipped without dry ice at room temperatures. The solid monomer reactant solutions can be heated to near or above the boiling point of the alcohol to form a liquid solution for resin infusion, prepregging or adhesive formulations. To improve the tackiness of the adhesives or prepregs, a small amount (<5% of solvent content) of 1-methyl-2-pyrrolidinone or higher alcohols C3–C6 or other organic solvents or fillers inert to the monomer reactants can be added to the solution.

The following specific examples illustrate the highly concentrated solutions of polyimide precursors (monomers) and the method of preparing same.

EXAMPLE 1

A mixture of 1188.648 gm (2.7 mole) of 4,4'-(hexafluoroisopropylidene)diphthalic anhydride (HFDA), 148–938 gm (0.6 mole) of 4-phenylethynylphthalic anhydride (PEPA) and 436 gm of ethanol was heated to reflux with mechanical stirring to form the corresponding ethyl esters. The reaction mixture was cooled down to 80–120° C. Then 324.42 g (3 mole) of p-phenylenediamine (p-PDA) was added with efficient stirring to form a homogeneous solution, like thick syrup with 92.4% solid content. The concentrated syrup solution was poured into a metal container and upon cooling to room temperature, the concentrated polyimide precursor solution solidified into solid form suitable for storage at room temperature and could be reheated to liquid solution for solvent assisted resin transfer molding (SaRTM) or resin infusion (RI).

EXAMPLE 2

A mixture of 128.892 g (0.4 mole) of 3,3',4,4'-benzophenonetetracarboxylic dianhydride (BTDA) and endo-cis-bycyclo[2.2.1]-5-heptane-2,3-dicarboxylic anhydride (nadic anhydride) and 106.7 gm of ethanol was heated to reflux with mechanical stirring to make the corresponding esters The reaction mixture was cooled to 80–120° C. and then 127.374 gm (0.6 mole) of 2,2'-dimethylbenzidine (DMBZ) was added slowly with efficient stirring to yield a homogeneous solution, like thick syrup, with 88% solid content. Upon cooling, the thick syrup solidified into solid form that could be warmed to form a liquid solution ready for hot-melt prepreg process.

For purpose of this invention, some of the preferred dianhydrides include pyromeliticdianhydride (PMDA); 3,3',4,4'-benzophenone tetracarboxylic dianhydride (s-BTDA); 4,4'-hexafluoroisopropylidene)-bis(phthalic anhydride) (HFDA); 3,3',4,4'-biphenyltetracarboxylic dianhydride (s-BPDA); 2,3,3',4'-benzophenone tetracarboxylicdianhydride(a-BPDA); 4,4-oxydiphthalic anhydride; 3,3'-oxydiphthalic anhydride; 5'-(1-methylethylidene)bis(4,1-phenyleneoxy)bis-1,3-isobenzofurandione(bisphenol A dianhydride). Specific examples of tetracarboxylic acid dianhydrides suitable for practicing this invention include:

2,3,3',4'-benzophenonetetracarboxylic acid dianhydride
3,3,4',4'-benzophenonetetracarboxylic acid dianhydride
2,2',3',3'-benzophenonetetracarboxylic acid dianhydride
2,3,3',4'-biphenyltetracarboxylic acid dianhydride
3,3',4,4 '-biphenyltetracarboxylic acid dianhydride
2,2',3,3 '-biphenyltetracarboxylic acid dianhydride
4,4'- isopropylidenediphthalic anhydride
3,3'- isopropylidenediphthalic anhydride
4,4'- oxydiphthalic anhydride
4,4'- sulfonyldiphthalic anhydride
3,3'- oxydiphthalic anhydride
4,4'- methylenediphthalic anhydride
4,4'-thiodiphthalic anhydride
4,4'- ethylidenediphthalic anhydride
hexafloroisopropylidene bisphthalic anhydride (6 FDA),
phenyltrifluoroethylidene bisphthalic anhydride (3 FDA),
2,3,6,7- naphthalenetetracarboxylic acid dianhydride
1,2,5,6- naphthalenetetracarboxylic acid dianhydride
benzene-1,2,3,4,-tetracarboxylic acid dianhydride
benzene-1,2,4,5-tetracarboxylic acid dianhydride
pryazine-2,3,5,6-tetracarboxylic acid dianhydride
thiophene-2,3,4,5-tetracarboxylic acid dianhydride, and the methyl or ethyl mono- or diesters thereof.

The preferred aromatic diamines include, p-phenylenediamine, m-phenylenediamine, methylene dianiline; 4,4'-oxydianiline; 3,4'-oxydianiline; 2,2'-dimethyl-4,4'-biphenyldiamine; 2,2'-bis(trifluoromethyl)-4,4'-biphenyldiamine; and 4,4'-diaminodiphenyl-sulfone.

Various polyfunctional aromatic amines, including the diamines, triamines and tetraamines and mixtures thereof can be used with the lower alkyl ester-acids, diesterdiacids and aromatic dianhydrides. These polyfunctional amines include the diamines, e.g. aromatic diamines containing at least one benzene ring and preferably two to three benzene rings such as:

para-phenylenediamine
meta-phenylenediamine
4,4'-diamino-diphenylpropane
4,4'-diamino-diphenylmethane
4,4'-benzidine
4,4'-diamino-diphenyl sulfide
4,4'-diamino-diphenyl sulfone
3,3'-diamino-diphenyl sulfone
1,5-diamino-naphthalene
bisaniline-m-xylidene (BAX)
bisaniline-p-xylidene (BAX)
bisaniline-p-benzyl carbonyl (COBAX)
3,3'-diaminobenzophenone
4,4'-diaminobenzophenone
3,3'-diaminodiphenylether
3,4'-diaminodiphenylether
4,4'-diaminodiphenylether
4,4'-diaminodiphenylmethane
3,3'-dimethoxy benzidine
2,2'-dimethylbenzidine
3,3'-dimethyl benzidine and triamines such as
1,3,5-triaminobenzene
2,4,6-triamino-s-triazine
4,4',4"-triaminotriphenylmethane
4,4',4"-triaminotriphenylcarbinol Endcaps used in replacement of the monofunctional anhydrides include the lower alkyl acid-esters and the monoamines. Some of the preferred crosslinkable endcaps include 3 or 4-phenylethynylphthalic anhydride; 3 or 4-phenylethynylatiline; p-aminostyrene; endo-cis-bicyclo[2.2.1]-5-heptent-2,3-dicarboxylic anhydride (nadic anhydride); 3 or 4-aminophenylacetylene and the like.

For example, in preparing the prepregs of this invention, an effective amount of a PMR highly concentrated polyimide precursor solution is coated or impregnated into graphite fiber wound on a drum. After sufficient fiber built-up on the drum, the fiber mat is removed from the drum and dried. The resulting mat or cloth i.e., "prepreg" is cut and laminated into the desired shape. In addition, a woven or pressed fabric of the reinforcing fibers can be coated with the precursor solution and dried, after which it is formed into the desired shape by procedures known in the art of fabricating prepregs. An effective amount of the polyimide resin ranges from about 20 to 60% by weight, and the fiber ranges from about 40 to 80% by weight. The curing of the impregnated fiber is by autoclave or compression molding at temperatures ranging from 600° F. to a temperature of about 700° F. at pressures of about 200 psi in an autoclave, and at these temperatures up to about 2000 psi in a mold.

For purposes of this invention, the term "fibrous material" includes fibers, filaments, continuous filaments, strands, bundles, whiskers, cloth, felt, and combinations thereof The fibrous material can be amorphous, crystalline, or mixture thereof The fibers may have various sizes and forms. Fibers may be monofilaments or tows of 100 to 6000 filaments. When used in this invention they may be woven into fabrics, pressed into mats, or aligned to obtain the required physical properties. The use of whiskers and fibers to prepare prepregs is well known. However, whiskers are specifically characterized as relatively short, single-crystal fibers of small diameter, whereas fibers may be multicrystalline or amorphous and are sufficiently long to be used in woven bundles, tows or cloth.

Various embodiments and modifications of this invention are apparent and can be made by those skilled in the art without departing from the spirit and scope of the invention as set forth in the appended claims.

What is claimed is:

1. A method of preparing a stable high-solids mixture of polyimide precursors having an improved shelf life, by preventing the premature polymerization and aging of said mixture which comprises preparing a solution of a lower molecular weight alcohol containing effective amounts of at least one aromatic dianhydride, at least one aromatic diamine, and an aromatic monofunctional endcap, and subsequently heating said alcohol solution to obtain a mixture of said solids content ranging from about 85 to 98 percent by weight of said polyimide precursors.

2. The method of preparing the polyimide precursor mixture of claim 1 wherein the dianhydride is selected from the group consisting of aromatic dianhydrides and alkyl ester-acids of aromatic dianhydrides wherein the alkyl ester is a methyl or ethyl ester, and the monofunctional endcap is selected from the group consisting of aromatic monoamines, aromatic monoanhydrides and alkyl esters of monoanhydrides wherein the alkyl ester is a methyl or ethyl ester.

3. The method of preparing the polyimide precursor mixture of claim 2 wherein the alkyl esters of the monoanhydrides are ethyl esters or monoanhydrides.

4. The method of preparing the polyimide precursor mixture of claim 2 wherein the alkyl ester-acids of the aromatic dianhydrides are ethyl esters of the aromatic dianhydrides.

5. The method of preparing the polyimide precursor mixture of claim 2 wherein the endcap is a monofunctional aromatic amine.

6. The method of preparing the polyimide precursor mixture of claim 2 wherein the alkyl ester of the monoanhydride is a monoalkyl ester of 5-norbornene-2,3-dicarboxylic acid wherein the alkyl ester is a methyl or ethyl ester.

7. The method of preparing the polyimide precursor mixture of claim 2 wherein the endcap is an aromatic monoanhydride.

8. The method of preparing the polyimide precursor mixture of claim 2 wherein the aromatic diamine is methylene dianiline, the dianhydride is 3,3',4,4'-benzophenonetetracarboxylic dianhydride and the endcap is an ethyl ester of the monoanhydride.

9. The method of preparing the polyimide precursor mixture of claim 2 wherein the lower molecular weight aliphatic alcohol is methyl alcohol.

10. The method of preparing the polyimide precursor mixture of claim 2 wherein the aliphatic alcohol is ethyl alcohol.

11. The method of preparing the polyimide precursor mixture of claim 2 wherein the endcap is endo-cis-bycyclo [2.2.1]-5-heptane-2,3-dicarboxylic anhydride, the dianhydride is 3,3', 4,4'-benzophenonetetracarboxylic dianhydride and the aromatic diamine is 2,2'-dimethylbenzidine.

12. The method of preparing the polyimide precursor mixture of claim 2 wherein the endcap is 4-phenylethynylphthalic anhydride, the dianhydride is 4,4'-(hexafluoroisopropylidene)diphthalic anhydride, and the aromatic diamine is phenylenediamine.

13. The high-solids mixture of polyimide precursors obtained by the method of claim 1.

14. A method of preparing a fibrous prepreg comprising a fibrous material coated or impregnated with an effective amount of a stable high-solids mixture of polyimide precursors; said mixture of polyimide precursors derived from a lower molecular weight alcohol solution containing effective amounts of at least one aromatic dianhydride, at least one aromatic diamine, and an aromatic monofunctional endcap; said alcohol solution heated to obtain a stable mixture having a solids content ranging from 85 to 98 percent by weight of said polyimide precursors.

15. The method of preparing the fibrous prepreg of claim 14 wherein the dianhydride is selected from the group consisting of aromatic dianhydrides and alkyl ester-acid aromatic dianhydrides wherein the alkyl ester group has 1 or 2 carbons, and the monofunctional endcap is selected from the group consisting of aromatic monoamines, aromatic monoanhydrides and alkyl esters of monoanhydrides wherein the alkyl ester groups have 1 or 2 carbons.

16. The method of preparing the prepreg of claim 15 wherein the fibrous material comprises carbon fibers.

17. The method of preparing the prepreg of claim 15 wherein the fibrous material comprises glass fibers.

18. The prepreg of claim 15 wherein the alkyl ester-acid aromatic dianhydride is an ethyl ester-acid of the aromatic dianhydride.

19. The method of preparing the prepreg of claim 15 wherein the endcap is an aromatic monoanhydride.

20. The fibrous prepreg obtained by the method of claim 15.

* * * * *